United States Patent
Kowalewski et al.

(10) Patent No.: US 10,178,236 B2
(45) Date of Patent: *Jan. 8, 2019

(54) EMERGENCY CALL HANDLING

(71) Applicant: INTEL IP CORPORATION, Santa Clara, CA (US)

(72) Inventors: Frank Kowalewski, Goettingen (DE); Muthaiah Venkatachalam, Beaverton, OR (US); Thomas Luetzenkirchen, Taufkirchen (DE); Usharani Ayyalasomayajula, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,725

(22) Filed: Apr. 3, 2017

(65) Prior Publication Data

US 2017/0208180 A1 Jul. 20, 2017

Related U.S. Application Data

(63) Continuation of application No. 14/495,469, filed on Sep. 24, 2014, now Pat. No. 9,615,234.

(Continued)

(51) Int. Cl.
*H04M 11/04* (2006.01)
*H04B 7/00* (2006.01)
(Continued)

(52) U.S. Cl.
CPC .......... *H04M 11/04* (2013.01); *G08B 25/016* (2013.01); *H04B 7/00* (2013.01); *H04L 1/1678* (2013.01);
(Continued)

(58) Field of Classification Search
CPC ......... H04W 72/0413; H04W 72/0446; H04W 84/042; H04W 84/12; H04W 92/02;
(Continued)

(56) References Cited

U.S. PATENT DOCUMENTS

2005/0282518 A1  12/2005  D'Evelyn et al.
2012/0108198 A1  5/2012  Edge et al.
(Continued)

FOREIGN PATENT DOCUMENTS

CN    102362476 A    2/2012
KR    1020110117225 A    10/2011
WO    WO 2010093646 A1    8/2010

OTHER PUBLICATIONS

Quectel; "GSM eCall Application Note"; GSM Quectel Cellular Engine; Apr. 6, 2012; 20 pages; V1.1.
(Continued)

*Primary Examiner* — Huy C Ho
(74) *Attorney, Agent, or Firm* — Thorpe North & Western LLC

(57) ABSTRACT

Technology for initiating emergency calls is disclosed. A minimum set of emergency related data (MSD) associated with the emergency call may be identified at a terminal equipment (TE) of a mobile terminal. An attention (AT) command may be generated that includes the MSD and selected configuration information related to the emergency call. The AT command may be sent from the TE of the mobile terminal to a mobile termination (MT) of the mobile terminal in order to setup the emergency call, wherein the mobile terminal (MT) routes the emergency call to a public safety answering point (PSAP) in a communication network.

22 Claims, 7 Drawing Sheets

Related U.S. Application Data

(60) Provisional application No. 61/893,792, filed on Oct. 21, 2013.

(51) Int. Cl.

| | | |
|---|---|---|
| *H04L 29/06* | (2006.01) | |
| *H04L 1/16* | (2006.01) | |
| *H04L 5/14* | (2006.01) | |
| *H04W 72/04* | (2009.01) | |
| *H04W 92/02* | (2009.01) | |
| *H04W 28/02* | (2009.01) | |
| *H04W 88/06* | (2009.01) | |
| *H04W 8/08* | (2009.01) | |
| *H04W 36/00* | (2009.01) | |
| *H04W 64/00* | (2009.01) | |
| *H04W 76/00* | (2018.01) | |
| *H04L 12/855* | (2013.01) | |
| *H04L 12/859* | (2013.01) | |
| *H04L 12/841* | (2013.01) | |
| *H04W 4/02* | (2018.01) | |
| *H04W 72/08* | (2009.01) | |
| *H04W 4/021* | (2018.01) | |
| *H04W 28/08* | (2009.01) | |
| *G08B 25/01* | (2006.01) | |
| *H04W 76/50* | (2018.01) | |
| *H04W 4/90* | (2018.01) | |
| *H04W 84/04* | (2009.01) | |
| *H04W 84/12* | (2009.01) | |
| *H04W 88/08* | (2009.01) | |

(52) U.S. Cl.
CPC ............ *H04L 5/14* (2013.01); *H04L 47/2466* (2013.01); *H04L 47/2475* (2013.01); *H04L 47/28* (2013.01); *H04L 65/1006* (2013.01); *H04L 65/1016* (2013.01); *H04L 65/1069* (2013.01); *H04W 4/022* (2013.01); *H04W 4/027* (2013.01); *H04W 4/90* (2018.02); *H04W 8/08* (2013.01); *H04W 28/0226* (2013.01); *H04W 28/0247* (2013.01); *H04W 28/0268* (2013.01); *H04W 28/08* (2013.01); *H04W 36/00* (2013.01); *H04W 36/0061* (2013.01); *H04W 64/006* (2013.01); *H04W 72/0413* (2013.01); *H04W 72/0446* (2013.01); *H04W 72/085* (2013.01); *H04W 76/00* (2013.01); *H04W 76/50* (2018.02); *H04W 88/06* (2013.01); *H04W 92/02* (2013.01); *H04L 1/1607* (2013.01); *H04M 2242/04* (2013.01); *H04W 84/042* (2013.01); *H04W 84/12* (2013.01); *H04W 88/08* (2013.01); *Y02D 70/12* (2018.01); *Y02D 70/126* (2018.01)

(58) Field of Classification Search
CPC ......... H04W 28/0226; H04W 28/0247; H04W 88/06; H04W 36/0061; H04W 64/006; H04W 88/08; H04W 76/00; H04W 28/0268; H04L 65/1069; H04L 65/1016; H04L 1/1678; H04L 5/14; H04L 47/2466; H04L 47/2475; H04L 47/28; H04L 1/1607; H04L 65/1006; H04M 11/04
USPC ...................................................... 455/404.1
See application file for complete search history.

(56) References Cited

U.S. PATENT DOCUMENTS

2012/0208492 A1\* 8/2012 Tschofenig .......... H04M 3/5116
455/404.2
2012/0289182 A1 11/2012 Bourdu et al.

OTHER PUBLICATIONS

3GPP TS 22.101; "3$^{rd}$ Generation Partnership Project; Technical Specification Group Services and System Aspects; Service aspects; Service principles"; Dec. 2010; 60 pages; V 10.5.0; Release 10.
Extended European search report for PCT Application No. EP 14 85 5363PCT/US2014057448 filed May 18, 2017.
3GPP TS 22.101; "Technical Specification Group Services and System Aspects; Service Aspects"; Service Principles; Jun. 2010; 60 pages; V10.30.0; Release 10; France.
3GPP TS 23.167; "IP Multimedia Subsystem (IMS) Emergency Sessions"; Technical Specification Group Services and System Aspects; Sep. 2013; 42 pages; V11.8.0; Release 11; France.
3GPP TS 26.267; "eCall Data Transfer; In-Band Modem Solution; General Description"; Technical Specification Group Services and System Aspects; Dec. 2012; 36 pages; V12.0.0; Release 12; France.
3GPP TS 27.007; "AT Command set for User Equipment (UE)"; Technical Specification Group Core Network and Terminals; Sep. 2013; 310 pages, V12.2.0; Release 12; France.
PCT Search Report for application No. PCT/US2014/057448, dated Dec. 18, 2014; 10 pages.
Rosen et al.; "Internet Protocol-Based In-Vehicle Emergency Call Draft-Rosen-Ecrit-Ecall-10.txt"; ECRIT Internet-Draft; Jan. 2014; 28 pages; IETF Trust.
Rosenberg et al.; "SIP: Session Initiation Protocol"; Network Working Group Request for Comments; Jun. 2002; 265 pages; The Internet Society.

\* cited by examiner

EMERGENCY CALL HANDLING

RELATED APPLICATIONS

This application is a continuation of U.S. patent application Ser. No. 14/495,469 filed Sep. 24, 2014 which claims priority to U.S. Provisional Patent Application No. 61/893,792, filed Oct. 21, 2013, the entire specification of which is hereby incorporated by reference in its entirety for all purposes.

BACKGROUND

Emergency call services provided by network operators may allow callers to contact local emergency services for assistance. The caller may dial an emergency telephone number, such as 9-1-1 in the United States, in order to connect with emergency service personnel. The caller may dial the emergency telephone number on a cellular phone or a landline telephone. An emergency telephone call may be answered by a telephone operator or an emergency dispatcher at a call center, also known as a public safety answering point (PSAP). The emergency telephone call may be routed to the PSAP over a public switched telephone network (PSTN) when the caller dials the emergency telephone number using the landline telephone, or a cellular network when the caller dials the emergency telephone number using the cellular phone. A nature of the emergency (e.g., police, fire, medical) may be determined and appropriate help may be dispatched, for example, to a current location of the caller.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
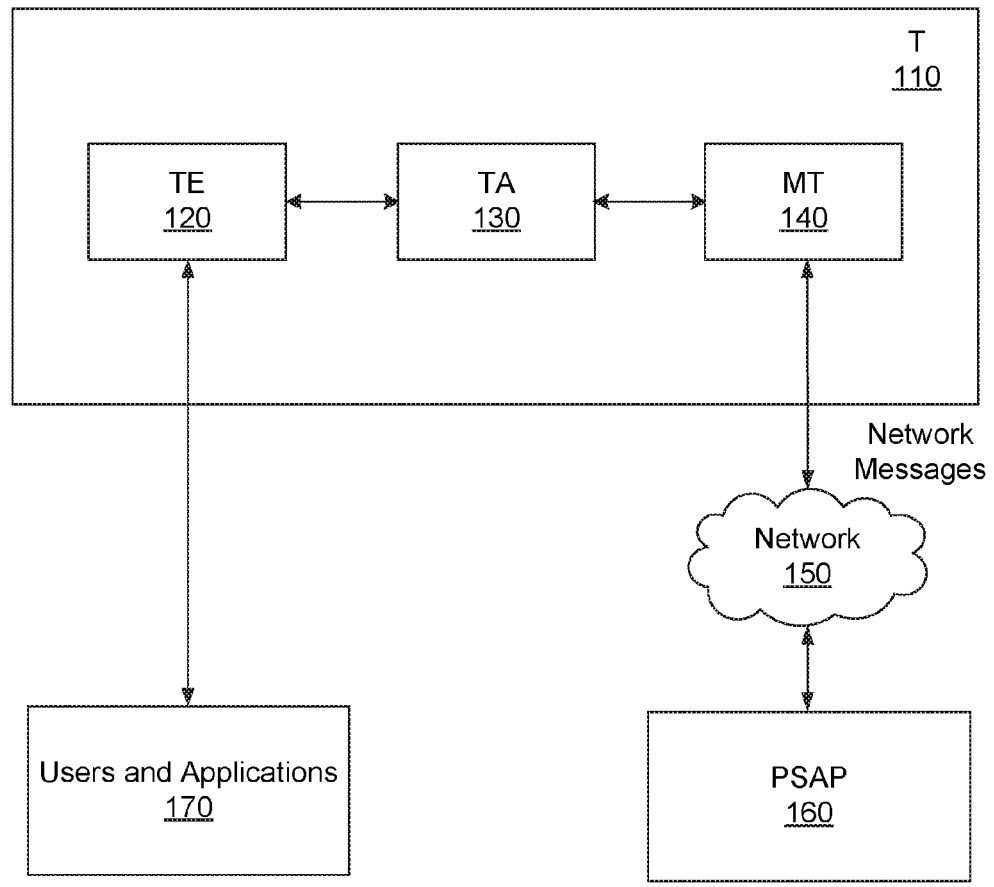
FIG. 1 illustrates a mobile terminal (T) operable to initiate an emergency call to a public safety answering point (PSAP) over a communication network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE).

Emergency calls may be initiated by communication devices (e.g., mobile phones) by setting up an emergency voice call. The emergency voice call may include a special emergency call indication. In other words, the emergency voice call may be indicated as being related to a request for emergency services. The emergency voice call may be routed to a public safety answering point (PSAP) located in a network. The PSAP may connect the emergency voice call to relevant safety personnel (e.g., police station, fire station, hospital).

One type of emergency call service is an eCall. The emergency call (eCall) may be initiated automatically or manually from a vehicle, such as an automobile, motorcycle, boat, bicycle, train, bus, truck, etc. The eCall may provide rapid assistance to motorists involved in a vehicle collision or request emergency services for additional reasons (e.g., medical emergencies). A mobile terminal (T) is an electronic communication device that may be installed in the vehicle, and when a serious road accident or emergency event occurs, the mobile terminal may automatically dial an emergency telephone number for connecting with the PSAP. In other words, the mobile device may initiate the eCall to the PSAP. Alternatively, the mobile terminal may be a stand-alone device carried by a user, and if an emergency event occurs, the mobile terminal may automatically or manually dial the emergency telephone number for connecting with the PSAP. The eCall may be supplemented with a minimum set of emergency related data (MSD). In one example, the MSD may be approximately 140 bytes in size. The MSD may include a current time and a current location of the vehicle and/or the user, such as global positioning system (GPS) coordinates for the vehicle and/or the user. In addition, the MSD may include vehicular system information, such as airbag deployment, brake information, speed information and/or impact sensor information collected at the vehicle when the accident occurs.

Traditional eCall techniques are based on circuit switched (CS) emergency calls. For example, MSD for the eCall may be communicated to the PSAP in-band in audio streams, i.e., via user plane communication paths. The 3GPP LTE standard has proposed extending the eCall to Internet Protocol Multimedia Subsystem (IMS)-based emergency calls. In other words, eCalls may be transmitted using the IMS architectural framework. Therefore, MSD for the eCall may be communicated to the PSAP using Session Initiation Protocol (SIP) invite messages, i.e., via control plane communication paths. In one configuration, the SIP invite message may include a reference or pointer to information that is remotely stored at a server. For example, the information may be relatively large in size (e.g., photographs of an accident scene), and rather than including the information in the SIP invite message itself, the reference or pointer to the information may be provided to the PSAP. At the PSAP, the information may be accessed from the server.

The mobile terminal (T) that is operable to initiate the emergency call may include a mobile termination (MT) and a terminal equipment (TE). The mobile termination may include modem hardware, such as senders and receivers for inter device communications. The mobile termination may be controlled by the terminal equipment, i.e., hardware that interacts with end users and includes application processors, via attention (AT) commands. The AT commands are further defined in 3GPP LTE Technical Specification (TS) 27.007 Release 12, as well as earlier releases of the 3GPP LTE standard. In other words, the AT commands enable communication between the terminal equipment and the mobile termination via the terminal adaptor. While previous versions of the 3GPP LTE standard have defined an AT command for initiating eCalls at the mobile terminal, this AT command does not enable eCall data (e.g., MSD) to be provided to the mobile termination. In other words, the communication of data related to the emergency situation is not currently allowed through AT commands that are defined in the 3GPP LTE Release 12 standard and earlier releases.

As described herein, eCall data (e.g., MSD) may be provided to the mobile termination of the mobile terminal via AT commands. The mobile termination may include the eCall data in the emergency call, for example, when connecting to the PSAP. As a result, the PSAP may gather information surrounding the circumstances of the emergency situation. The eCall data may be provided to the mobile termination via an extended version of an existing +CECALL command or a novel AT command. In other words, the existing +CECALL command may include an AT command that is communicated between the terminal equipment and the mobile termination via the terminal adaptor.

The eCall data may be provided to the mobile termination through novel parameters included in the AT command. As examples of eCall data, the MSD may be provided using a novel <msd_data> parameter, and additional data related to the emergency situation may be provided using a novel <add_data> parameter. The additional data may be requested to be transmitted within the eCall, or alternatively, the additional data may be requested to be transmitted through an external reference, by using a novel (add_type> parameter. With the extended version of the existing +CECALL command, MSD and/or additional data may be provided for an ongoing eCall by setting a <type_of_eCall> parameter to a novel value of "4," thereby indicating a current eCall. Therefore, the eCall data may be provided during an ongoing eCall using the extended version of the existing +CECALL command. If an eCall is currently not ongoing, the eCall data may be provided in the AT command when an eCall is being initiated at the mobile termination.

The technology described herein offers a number of advantages over previous AT commands that are described in the 3GPP LTE standard (e.g., Release 12 and earlier). As examples, the novel AT commands described herein may provide eCall data to the mobile termination. Using the novel AT commands described herein, the eCall data may be provided for eCalls that are ongoing, or alternatively, for eCalls that are to be initiated at the mobile termination. The novel AT commands described herein indicates whether the eCall data is to be transmitted via an external reference or within the eCall. The novel AT commands described herein may be compatible with existing AT commands described in the 3GPP LTE specification. In addition, the novel AT commands described herein may support an IMS-based eCall service.

FIG. 1 illustrates a mobile terminal (T) 110 operable to initiate an emergency call (eCall) to a public safety answering point (PSAP) 160 over a communication network 150. The mobile terminal 110 may also be known as mobile equipment (ME). The mobile terminal 110 may be further described in 3GPP TS 27.007 Release 12 and earlier releases. The mobile terminal 110 may include terminal equipment (TE) 120, a terminal adaptor (TA) 130 and a mobile termination (MT) 140. The terminal equipment 120 may support users and applications 170. In other words, the terminal equipment 120 may provide application and user interface functionality. The mobile termination 140 may provide modem functionality. In other words, the mobile termination 140 may communicate network messages to the PSAP 160 over the communication network 150. The terminal equipment 120 and the mobile termination 140 may communicate with one another using attention (AT) commands via a terminal adaptor (TA) 130.

The mobile terminal 110 may be an electronic communication device that is installed on a vehicle, and when a serious road accident or emergency event occurs, the mobile terminal 110 may (via the mobile termination 140) automatically initiate the eCall for communicating with the PSAP 160. Alternatively, the mobile terminal 110 may be carried by a user (e.g., the mobile terminal 110 may be inside the user's pocket), and if an emergency event occurs, the mobile terminal 110 may automatically or manually initiate the eCall for connecting with the PSAP 160. As an example, the user associated with the mobile terminal 110 may be involved in a vehicle accident. An in-vehicle system (IVS) in the vehicle may be connected to the mobile terminal 110. The IVS may automatically initiate the eCall using the mobile terminal 110. The IVS may determine a minimum set of eCall data (e.g., the MSD) to be communicated during the eCall. The eCall data may include a current time and a current location of the vehicle and/or the user. The current location of the vehicle and/or the user may be represented using global positioning system (GPS) coordinates. In addition, the eCall data may include vehicular system information, such as airbag deployment, brake information, speed information and/or impact sensor information collected at the vehicle when the accident occurs. As other examples, the eCall data may relate to information describing or characterizing the road accident or emergency event, such as images of the scene, possible injuries suffered by users at the scene, etc.

In one example, the IVS may trigger the mobile terminal 110 to set up the eCall with the PSAP 160. In particular, the IVS may trigger the mobile terminal 110 to initiate the eCall using the eCall data (e.g., the MSD) related to the vehicle accident or emergency situation. The terminal equipment 120 of the mobile terminal 110 may receive the external trigger from the IVS. As described in greater detail below, the terminal equipment 120 may send AT commands to the mobile termination 140, via the terminal adapter 130, in order to request the mobile termination 140 to setup the eCall with the PSAP 160. In addition, the eCall data may be included in the eCall to assist the PSAP 160 in determining appropriate emergency services for the user associated with the mobile terminal 110.

Figure 2:
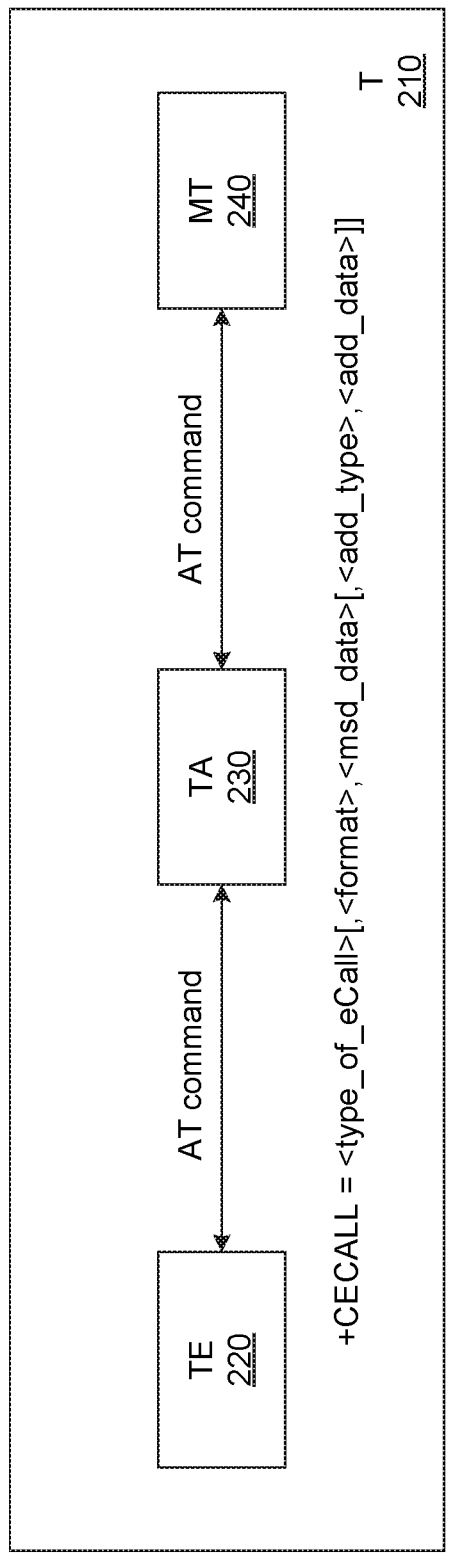
FIG. 2 is a diagram illustrating a mobile terminal (T) that is operable to initiate an emergency call to a public safety answering point (PSAP) in accordance with an example.

FIG. 2 is a diagram illustrating a mobile terminal (T) 210 that is operable to initiate an emergency call (eCall). For example, the eCall may be initiated with a public safety answering point (PSAP). A terminal equipment (TE) 220 may communicate an attention (AT) command to a mobile termination (MT) 240, via a terminal adapter (TA) 230, in order to request the mobile termination 240 to setup the eCall.

In one configuration, the AT command communicated to the mobile termination 240 may be an extended +CECALL command. The general syntax and semantics for the +CECALL command may be +CECALL=<type_of_eCall>[,<format>,<msd_data>[,<add_type>,<add_data>]]. In other words, the terminal equipment 220 may communicate the +CECALL command to the mobile termination 240 via the terminal adapter 230.

The <type_of_eCall> parameter included in the +CECALL command may indicate a type of eCall that is to be initiated at the mobile termination 240. The <type_of_eCall> parameter may be of an integer type. For example, the <type_of_eCall> parameter may be set to "0" to indicate that the eCall is a test call, the <type_of eCall> parameter may be set to "1" to indicate that the eCall is a reconfiguration eCall, the <type_of_eCall> parameter may be set to "2" to indicate that the eCall is a manually initiated eCall, the <type_of_eCall> parameter may be set to "3" to indicate that the eCall is an automatically initiated eCall, or the <type_of_eCall> parameter may be set to "4" to indicate that the eCall is a current eCall.

The <format> parameter included in the +CECALL command may indicate a format of eCall data that is to be provided during the eCall. The <format> parameter may be of an integer type. For example, the <format> parameter may be set to "0" to indicate that the format of the eCall data is an Extensible Markup Language (XML) format, or the <format> parameter may be set to "1" to indicate that the format of the eCall data is a binary format.

The <msd_data> parameter included in the +CECALL command may indicate a minimum set of data that is to be provided during the eCall. The <msd_data> parameter may be of a string type. As an example, the <msd_data> parameter may include a string of characters representing the current location of a user and/or a vehicle. In one configuration, the <msd_data> may be approximately 140 bytes in size.

The <add_type> parameter included in the +CECALL command may indicate a type of transmission for the additional data. The <add_type> parameter may be of an integer type. As an example, the <add_type> parameter may be set to "0" to indicate that the additional data is to be transmitted within the eCall, the <add_type> parameter may be set to "1" to indicate that the additional data is to be transmitted by reference (e.g., the eCall may include a pointer or reference to an external server that stores the additional data), or the <add_type> parameter may be set to "2" to indicate that the type of transmission for the additional data is undecided.

The <add_data> parameter included in the +CECALL command may indicate additional data that is to be included in the eCall. The <add_data> parameter may be of a string type. As an example the <add_data> parameter may include audio, pictures, etc. related to the vehicle accident or the emergency situation. In addition, the <add_data> parameter may include the pointer or reference, such as a uniform resource locator (URL), to indicate a location of the additional data on a network server.

As a non-limiting example, the terminal equipment 220 may request the mobile termination 240 to setup the eCall by sending the +CECALL command (i.e., an AT command) to the mobile termination 240 with the following parameters: +CECALL=3,0,<msd_data>,0,<add_data>, wherein the first parameter "3" indicates that the eCall is an automatically initiated eCall, the second parameter "0" indicates that the eCall data is provided in XML format, the third parameter <msd_data> is the MSD data in XML format, the fourth parameter "0" indicates that the additional data is to be transmitted within the eCall, and the fifth parameter <add_data> is the additional data in XML format.

As another non-limiting example, an ongoing eCall may be occurring at the mobile termination 240. In other words, the ongoing eCall may be taking place between the mobile terminal 210 and the PSAP. The user associated with the mobile terminal 210 may take pictures of the accident scene and, using the mobile terminal 210, request to add the pictures to the ongoing eCall. Therefore, the terminal equipment 220 may send an AT command to the mobile termination 240 in order to send the additional pictures. The AT command sent to the mobile termination 240 may be represented as follows: +CECALL=4,1,,1,<add_data>, wherein the first parameter "4" indicates that the eCall data is to be transmitted for the ongoing eCall, the second parameter "1" indicates that the eCall data is provided in a binary format, the fourth parameter 1" indicates that the additional data is to be transmitted via an external data server and is only referenced within the eCall, and the fifth parameter <add_data> is the additional picture data to be added to the eCall. In this example, the +CECALL command may not include the third parameter of <msd_data> because there is no MSD to be sent in the ongoing eCall.

Figure 3:
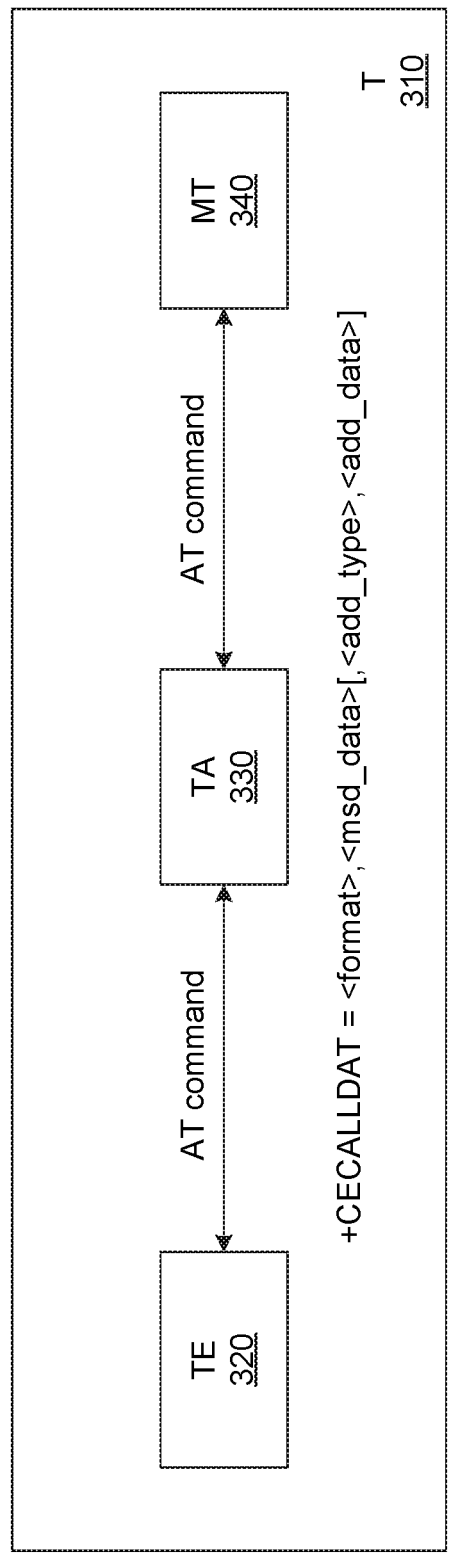
FIG. 3 is an additional diagram a mobile terminal (T) that is operable to initiate an emergency call to a public safety answering point (PSAP) in accordance with an example.

FIG. 3 is a diagram illustrating a mobile terminal (T) 310 that is operable to initiate an emergency call (eCall). In one example, the eCall may be initiated with a public safety answering point (PSAP). A terminal equipment (TE) 320 may communicate an attention (AT) command to a mobile termination (MT) 340, via a terminal adapter (TA) 330, in order to request the mobile termination 340 to setup the eCall.

In one configuration, the AT command communicated to the mobile termination 340 may be a +CECALLDAT command. In other words, rather than using an extended version of an existing +CECALL command (as discussed in FIG. 2), a novel AT command may be used to provide the eCall. The general syntax and semantics for the +CECALLDAT command may be +CECALLDAT=<format>,<msd_data>[,<add_d_type>,<add_data>]. In other words, the terminal equipment 320 may communicate the +CECALLDAT command to the mobile termination 340 via the terminal adapter 330.

The <format> parameter included in the +CECALLDAT command may indicate a format of eCall data that is to be provided during the eCall. The <format> parameter may be of an integer type. For example, the <format> parameter may be set to "0" to indicate that the format of the eCall data is an Extensible Markup Language (XML) format, or the <format> parameter may be set to "1" to indicate that the format of the eCall data is a binary format.

The <msd_data> parameter included in the +CECALL-DAT command may indicate a minimum set of data that is to be provided during the eCall. The <msd_data> parameter may be of a string type. As an example, the <msd_data> parameter may include a string of characters representing the current location of a user and/or a vehicle. In one configuration, the <msd_data> may be approximately 140 bytes in size.

The <add_type> parameter included in the +CECALL-DAT command may indicate a type of transmission for the additional data. The <add_type> parameter may be of an integer type. As an example, the <add_type> parameter may be set to "0" to indicate that the additional data is to be transmitted within the eCall, the <add_type> parameter may be set to "1" to indicate that the additional data is to be transmitted by reference (e.g., the eCall may include a pointer or reference to an external server that stores the additional data), or the <add_type> parameter may be set to "2" to indicate that the type of transmission for the additional data is undecided. The pointer or reference included in the <add_type> parameter may include a uniform resource locator (URL) indicating a location of the additional data.

The <add_data> parameter included in the +CECALL-DAT command may indicate additional data that is to be included in the eCall. The <add_data> parameter may be of a string type. As an example the <add_data> parameter may include audio, pictures, etc. related to the vehicle accident or the emergency situation.

After eCall data has been provided to the mobile termination 340, the terminal equipment 320 may send a +CECALL command to the mobile termination 340 for initiating the eCall. For example, the terminal equipment 320 may send +CECALL=0 to indicate that the eCall is a test call. The terminal equipment 320 may send +CECALL=1 to indicate that the eCall is a reconfiguration eCall. The terminal equipment 320 may send +CECALL=2 to indicate that the eCall is a manually initiated eCall. The terminal equipment 320 may send +CECALL=3 to indicate that the eCall is an automatically initiated eCall. The terminal equipment 320 may send +CECALL=4 to indicate that the eCall is a current eCall.

As a non-limiting example, the terminal equipment 320 may request the mobile termination 340 to setup the eCall by sending the +CECALLDAT command (i.e., an AT command) to the mobile termination 340 with the following parameters: +CECALLDAT=0,<msd_data>,0,<add_data>, wherein the first parameter "0" indicates that the eCall data is provided in XML format, the second parameter <msd_data> is the MSD data in XML format, the third parameter "0" indicates that the additional data is to be transmitted within the eCall, and the fourth parameter <add_data> is the additional data in XML format.

As another non-limiting example, an ongoing eCall may be occurring at the mobile termination 340. In other words, the ongoing eCall may be taking place between the mobile terminal 310 and a PSAP. The user associated with the mobile terminal 310 may take pictures of the accident scene and, using the mobile terminal 310, request to add the pictures to the ongoing eCall. Therefore, the terminal equipment 320 may send an AT command to the mobile termination 340 in order to send the additional pictures. The AT command sent to the mobile termination 340 may be represented as follows: +CECALLDAT=1,,1,<add_data>, wherein the first parameter "1" indicates that the eCall data is provided in a binary format, the third parameter 1" indicates that the additional data is to be transmitted via an external data server and is only referenced within the eCall, and the fourth parameter <add_data> is the additional picture data to be added to the eCall. In this example, the +CECALLDAT command may not include the second parameter of <msd_data> because there is no MSD to be sent in the ongoing eCall.

In one configuration, the mobile termination 340 may provide default eCall data when initiating the eCall. The mobile termination 340 may provide the default eCall data in response to determining that no data is provided for the eCall. In other words, default eCall data may be used when the AT command (e.g., the +CECALL command or the +CECALLDAT command) does not include <msd_data> and/or <add_data> parameters, or alternatively, when the <msd_data> and/or <add_data> parameters are empty.

In another configuration, the mobile termination 340 may receive AT commands from the terminal equipment 320 and respond with an error code when the AT commands are incorrect or incomplete. For example, the mobile termination 340 may receive the +CECALL command from the terminal equipment 320. The +CECALL command may include a <type_of_eCall> parameter set to "4" to indicate a current eCall, even though no eCall may be ongoing. Therefore, the mobile termination 340 may respond with a suitable error code to the terminal equipment 320.

In yet another configuration, the mobile terminal 310 may support multiple simultaneous eCalls. Therefore, the eCalls may be identified using an additional <cid> parameter in the AT command. For example, the <cid> parameter may be included in the +CECALL command or the +CECALLDAT command. The +CECALL command may be represented by +CECALL=<type_of_eCall>[,<cid>[,<format>,<msd_data>[,<add_type>,<add_data>]]] and the +CECALLDAT command may be represented by +CECALLDAT=<cid>, <format>,<msd_data>[,<add_type>,<add_data>]. The <type_of_eCall> parameter in the extended +CECALL command may be ignored, and as an example, a <type_of_eCall> value of "4" (i.e., indicating a current eCall) may be assumed if an existing <cid> parameter value is provided in the +CECALL command. In addition, the +CECALL command may respond a newly assigned <cid> parameter value for a newly initiated eCall.

In one configuration, the +CECALL command communicated between the terminal equipment 320 and the mobile termination 340 may include a <domain> parameter. The <domain> parameter may indicate whether the eCall is to be setup via a circuit switched (CS) domain or an Internet Protocol Multimedia Subsystem (IMS) domain. For example, the +CECALL command may be represented as +CECALL=<type_of_eCall>[,<cid>[,<domain>[,<format>,<msd_data>[,<add_type>,<add_data>]]]], wherein the <domain> parameter indicates the domain for setting up the eCall. The <domain> parameter may be of an integer type. For example, the <domain> parameter may be set to "0" to indicate that the domain for setting up the eCall is a CS domain, the <domain> parameter may be set to "1" to indicate that the domain for setting up the eCall is an IMS domain, or the <domain> parameter may be set to "2" to indicate that the domain for setting up the eCall is undecided.

Figure 4:
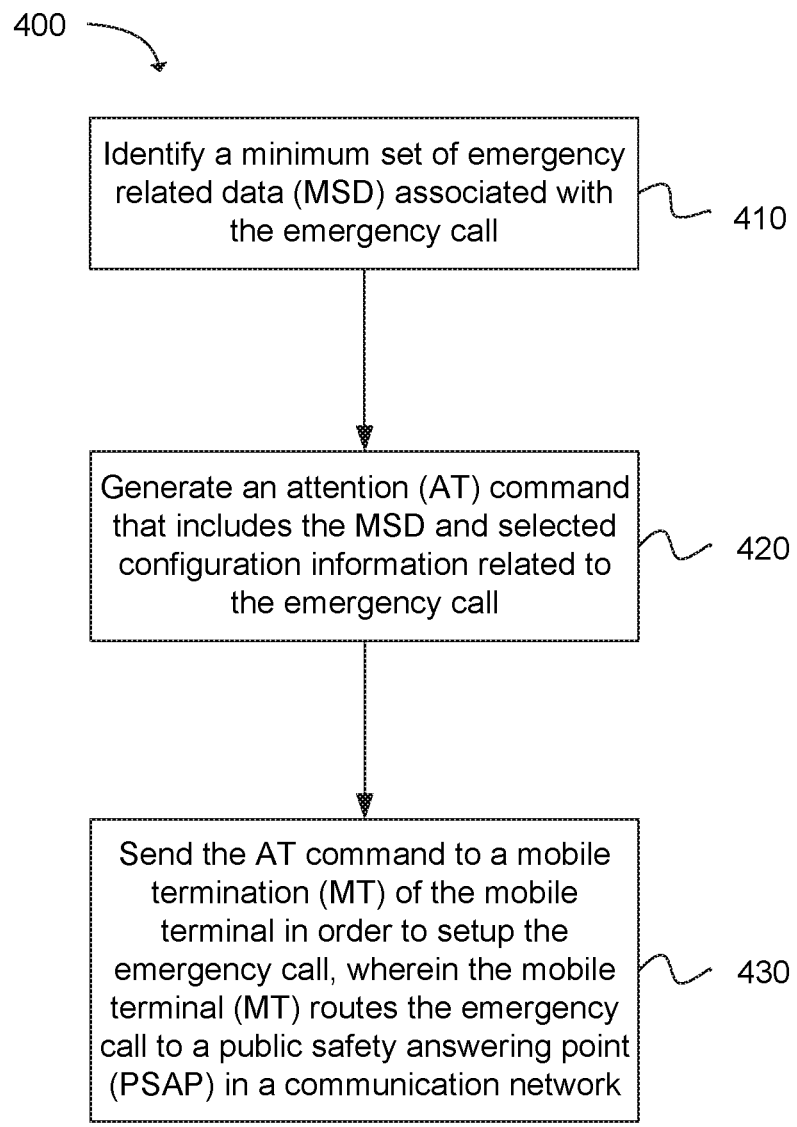
FIG. 4 depicts functionality of computer circuitry of a mobile terminal (T) operable to initiate an emergency call in accordance with an example.

Another example provides functionality 400 of computer circuitry of a mobile terminal (T) operable to initiate an emergency call, as shown in the flow chart in FIG. 4. The functionality may be implemented as a method or the functionality may be executed as instructions on a machine, where the instructions are included on at least one computer readable medium or one non-transitory machine readable storage medium. The circuitry can be configured to identify a minimum set of emergency related data (MSD) associated with the emergency call, as in block 410. The circuitry can be configured to generate an attention (AT) command that includes the MSD and selected configuration information related to the emergency call, as in block 420. In addition, the circuitry can be configured to send the AT command to a mobile termination (MT) of the mobile terminal in order to setup the emergency call, wherein the mobile terminal (MT) routes the emergency call to a public safety answering point (PSAP) in a communication network, as in block 430.

In one configuration, the circuitry can be further configured to generate the AT command in response to receiving a trigger from an in-vehicle system (IVS) associated with the mobile terminal. In another configuration, the circuitry can be configured to send the MSD from the mobile termination (MT) of the mobile terminal to the PSAP via a session initial protocol (SIP) invite message.

In one example, the mobile terminal is configured to initiate internet protocol multimedia subsystem (IMS) based emergency calls. In another example, the MSD associated with the emergency call includes a current time and a current location of the mobile terminal. In yet another example, the AT command is a +CECALL command, wherein a syntax of the +CECALL command is represented as +CECALL=<type_of_eCall>[,<format>,<msd_data>[,<add_type>,<add_data>]], wherein <type_of_eCall> indicate a type of emergency call, <format> indicates a format associated with the emergency call, <msd_data> is the MSD, <add_type> indicates a type of transmission for additional data, and <add_data> is the additional data.

In one configuration, the <type_of_eCall> indicates that the type of emergency call is at least one of: a manually initiated emergency call, an automatically initiated emergency call, or an ongoing emergency call. In another configuration, the <add_data> is a uniform resource locator (URL) to an external server that stores the additional data. In yet another configuration, the <add_type> indicates that the additional data is transmitted within the emergency call or via a reference to an external server that stores the additional data.

In one example, the AT command is a +CECALLDAT command, wherein a syntax of the +CECALLDAT command is represented as +CECALLDAT=<format>,<msd_data>[,<add_type>,<add_data>], wherein <format> indicates a format associated with the emergency call, <msd_data> is the MSD, <add_type> indicates a type of transmission for additional data, and <add_data> is the additional data. In another example, the circuitry can be further configured to send at least one of the +CECALL command or a +CECELLDAT command as the AT command, wherein the syntax of the +CECALL command is represented as +CECALL=<type_of_eCall>[,<cid>,[<format>,<msd_data>[,<add_type>,<add_data>]]} and a syntax of the +CECELLDAT command is represented as +CECALLDAT=<cid>,<format>,<msd_data>[,<add_type>, <add_data>], wherein <cid> indicates a call identifier (ID) when the MT supports multiple simultaneous emergency calls. In yet another example, the circuitry can be further configured to send at least one of the +CECALL command or the +CECELLDAT command as the AT command, wherein the syntax of the +CECALL command is represented as +CECALL=<type_of_eCall>[,<cid>[,<domain>[,<format>,<msd_data>[,<add_type>,<add_data>]]]] and the syntax of the +CECELLDAT command is represented as +CECALLDAT=<cid>,<domain>,<format>, <msd_data>[,<add_type>,<add_data>], wherein <domain> indicates whether the emergency call is set up via a circuit switched (CS) domain or an internet protocol multimedia subsystem (IMS) domain.

Figure 5:
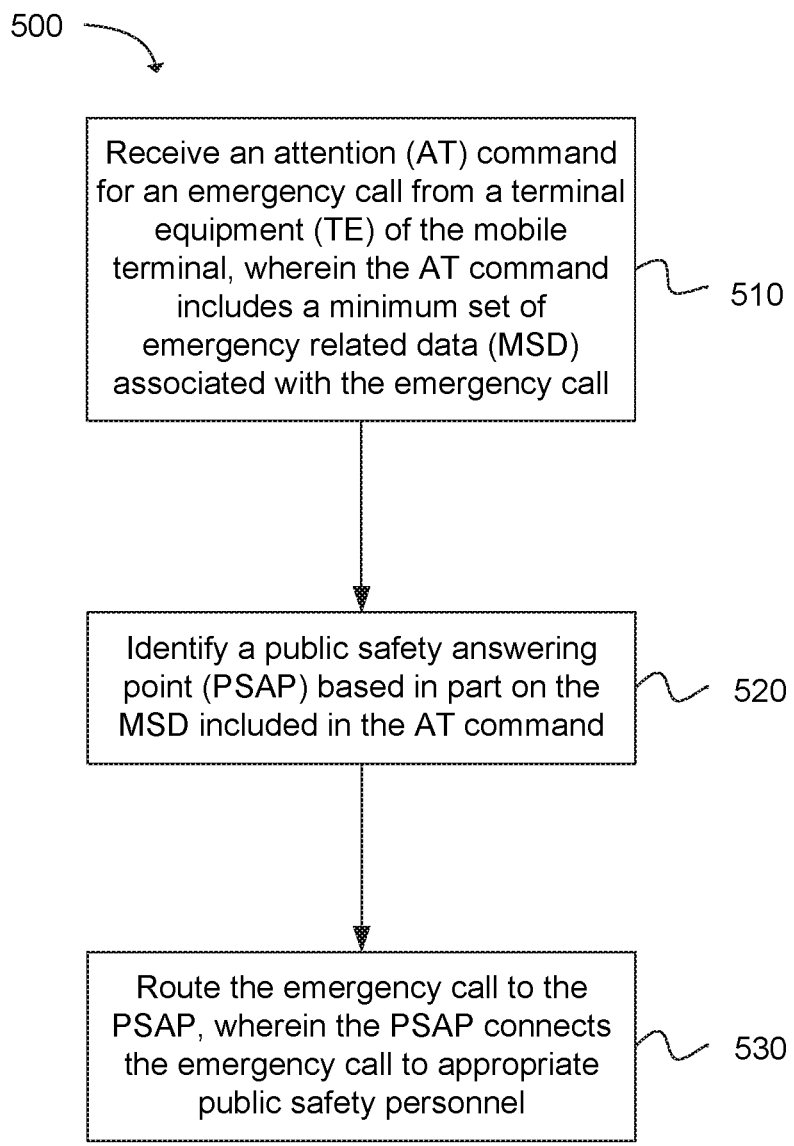
FIG. 5 depicts functionality of computer circuitry of a mobile termination (MT) operable to handle an emergency call in accordance with an example.

Another example provides functionality 500 of computer circuitry of a mobile termination (MT) operable to handle emergency calls, as shown in the flow chart in FIG. 5. The functionality may be implemented as a method or the functionality may be executed as instructions on a machine, where the instructions are included on at least one computer readable medium or one non-transitory machine readable storage medium. The circuitry can be configured to receive an attention (AT) command for an emergency call from a terminal equipment (TE) of the mobile terminal, wherein the AT command includes a minimum set of emergency related data (MSD) associated with the emergency call, as in block 510. The circuitry can be configured to identify a public safety answering point (PSAP) based in part on the MSD included in the AT command, as in block 520. The circuitry can be further configured to route the emergency call to the PSAP, wherein the PSAP connects the emergency call to appropriate public safety personnel, as in block 530.

In one example, the MSD associated with the emergency call includes a current time and a current location of the mobile terminal. In another example, the circuitry can be further configured to: determine that <msd_data> and <add_data> parameters are not provided in the AT command from the TE; and identify default data to be used in place of the <msd_data> and <add_data> parameters when initiating the emergency call.

In one configuration, the AT command received from the TE is a +CECALL command, wherein a syntax of the +CECALL command is represented as +CECALL=<type_of_eCall>[,<format>,<msd_data>[,<add_type>,<add_data>]], wherein <type_of_eCall> indicate a type of emergency call, <format> indicates a format associated with the emergency call, <msd_data> is the MSD, <add_type> indicates a type of transmission for additional data, and <add_data> is the additional data. In yet another configuration, the circuitry can be further configured to: determine that the +CECALL command received from the TE includes one or more parameters that are in error; and send, to the TE, an error code and a description of the error to enable the TE to resend the +CECALL command to the MT.

Figure 6:
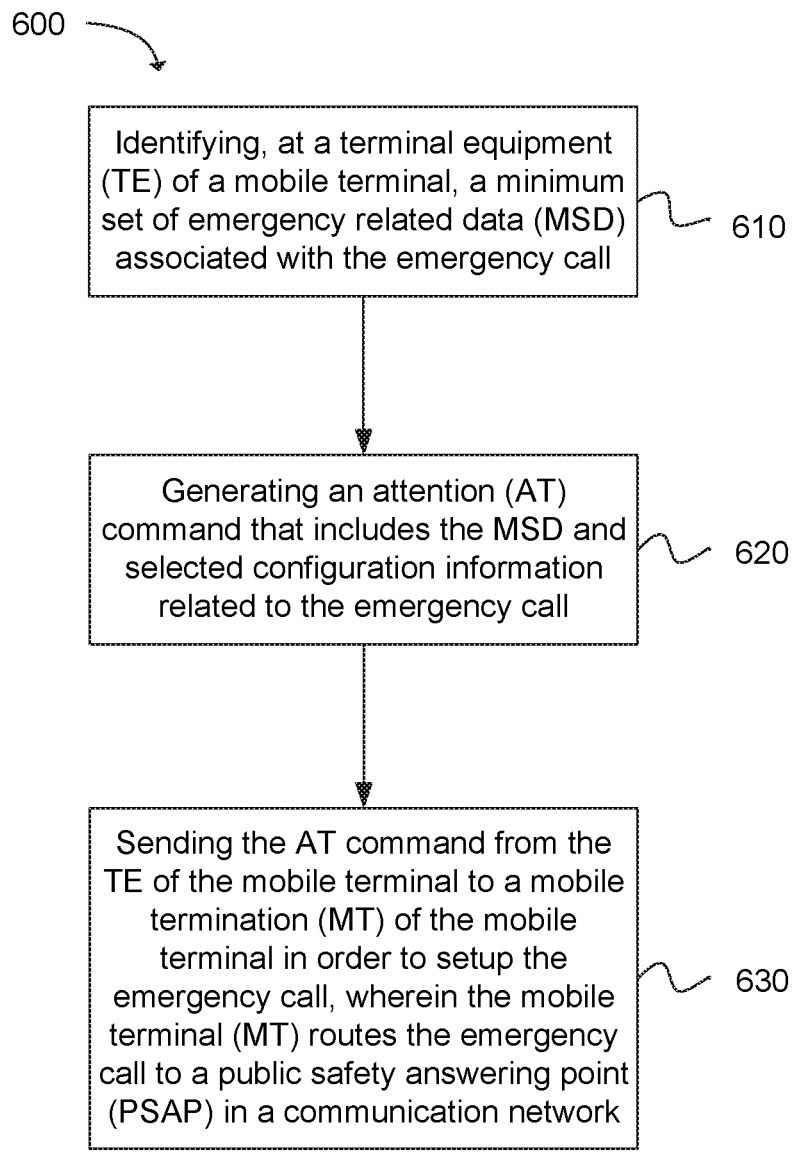
FIG. 6 depicts a flowchart of a method for initiating emergency calls in accordance with an example.

Another example provides a method 600 for initiating emergency calls, as shown in the flow chart in FIG. 6. The method may be executed as instructions on a machine, where the instructions are included on at least one computer readable medium or one non-transitory machine readable storage medium. The method can include the operation of identifying, at a terminal equipment (TE) of a mobile terminal, a minimum set of emergency related data (MSD) associated with the emergency call, as in block 610. The method can include the operation of generating an attention (AT) command that includes the MSD and selected configuration information related to the emergency call, as in block 620. In addition, the method can include the operation of sending the AT command from the TE of the mobile terminal to a mobile termination (MT) of the mobile terminal in order to setup the emergency call, wherein the mobile terminal (MT) routes the emergency call to a public safety answering point (PSAP) in a communication network, as in block 630.

In one example, the method can further include the operation of generating the AT command in response to receiving a trigger from an in-vehicle system (IVS) associated with the mobile terminal. In another example, the method can further include the operation of sending the MSD associated with the emergency call from the mobile terminal to the PSAP using a session initial protocol (SIP) invite message.

Figure 7:
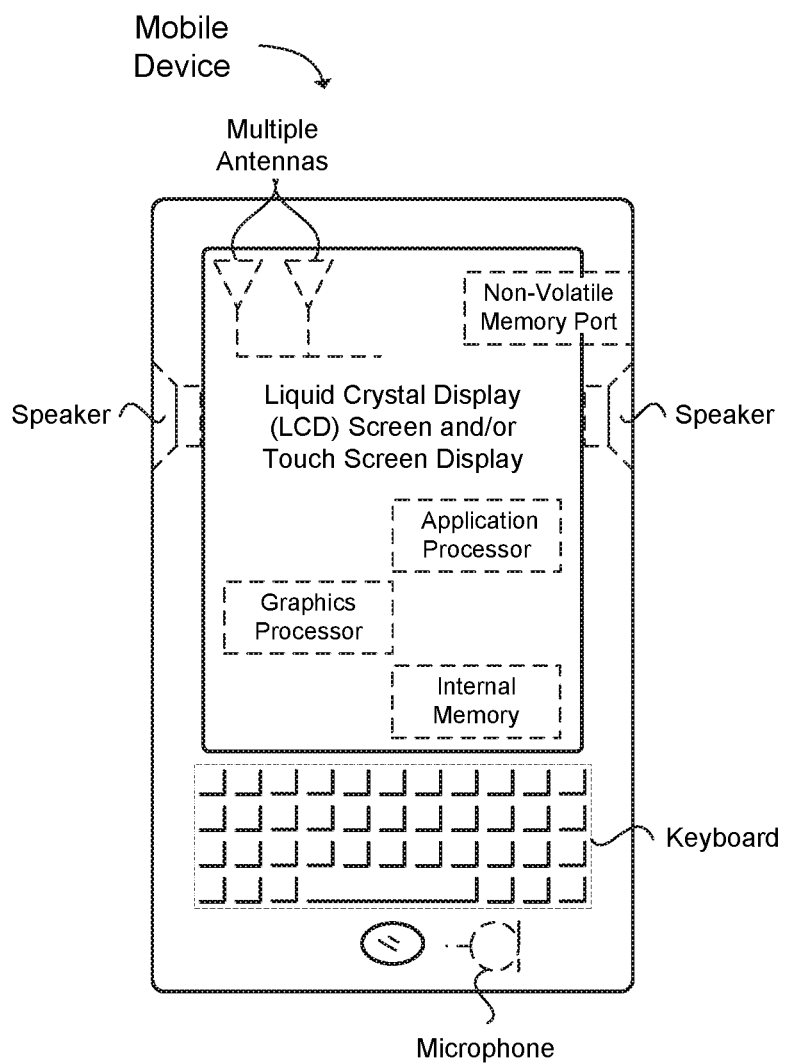
FIG. 7 illustrates a diagram of a wireless device (e.g., UE) in accordance with an example.

FIG. 7 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) operable to perform an emergency call (eCall), the apparatus comprising:
one or more processors configured to:
generate, at a terminal equipment (TE) of the UE, a command to trigger an eCall from the UE to a network, wherein the command includes a minimum set of emergency related data (MSD) associated with the eCall;
provide, from the TE of the UE, the command that includes the MSD to a mobile termination (MT) of the UE via a terminal adaptor (TA) of the UE; and
initiate, at the MT of the UE, the eCall to the network in response to receiving the command from the TE of the UE, wherein the MSD is provided to the network during initiation of the eCall to the network; and
memory operable to store the command.

2. The apparatus of claim 1, further comprising a transceiver configured to transmit the MSD received from the MT of the UE to the network.

3. The apparatus of claim 1, wherein the one or more processors are configured to generate, at the TE of the UE, a command to include additional data in an updated MSD to be provided to the network during an ongoing eCall at the UE.

4. The apparatus of claim 1, wherein the one or more processors are configured to generate, at the TE of the UE, the command to include:
a type of eCall parameter of an integer type, wherein the type of eCall parameter indicates a type of eCall;
a format parameter of an integer type, wherein the format parameter indicates a format of the MSD; and
an MSD data length parameter of an integer type, wherein the MSD data length parameter indicates a size of the MSD.

5. The apparatus of claim 4, wherein the type of eCall is one of: a test call represented by an integer value of "0", a reconfiguration call eCall represented by an integer value of "1", a manually initiated eCall represented by an integer value of "2" or an automatically initiated eCall represented by an integer value of "3".

6. The apparatus of claim 4, wherein the format of the MSD includes a binary format represented by an integer value of "1".

7. The apparatus of claim 1, wherein the MSD is of a string type.

8. The apparatus of claim 1, wherein the command is a +CECALL command, wherein a syntax of the +CECALL command is represented as +CECALL=<type_of_eCall>[,<format>,<msd_data_length>,<msd_data>], wherein <type_of_eCall> indicate a type of eCall, <format> indicates a format associated with the MSD, <msd_data_length> is a size of the MSD, and <msd_data> is the MSD.

9. At least one non-transitory machine readable storage medium having instructions embodied thereon for performing an emergency call (eCall) from a user equipment (UE), the instructions when executed by one or more processors of the UE perform the following:
generating, at a terminal equipment (TE) of the UE, a command to trigger an eCall from the UE to a network, wherein the command includes a minimum set of emergency related data (MSD) associated with the eCall;
providing, from the TE of the UE, the command that includes the MSD to a mobile termination (MT) of the UE via a terminal adaptor (TA) of the UE; and
initiating, at the MT of the UE, the eCall to the network in response to receiving the command from the TE of the EE, wherein the MSD is provided to the network during initiation of the eCall to the network.

10. The at least one machine readable storage medium of claim 9, further comprising instructions when executed perform the following: generating, at the TE of the UE, a command to include additional data in an updated MSD to be provided to the network during an ongoing eCall at the UE.

11. The at least one machine readable storage medium of claim 9, further comprising instructions when executed perform the following: generating, at the TE of the UE, the command to include:
a type of eCall parameter of an integer type, wherein the type of eCall parameter indicates a type of eCall;
a format parameter of an integer type, wherein the format parameter indicates a format of the MSD; and
an MSD data length parameter of an integer type, wherein the MSD data length parameter indicates a size of the MSD.

12. The at least one machine readable storage medium of claim 11, wherein the type of eCall is one of: a test call represented by an integer value of "0", a reconfiguration call eCall represented by an integer value of "1", a manually initiated eCall represented by an integer value of "2" or an automatically initiated eCall represented by an integer value of "3".

13. The at least one machine readable storage medium of claim 11, wherein the format of the MSD includes a binary format represented by an integer value of "1".

14. The at least one machine readable storage medium of claim 9, wherein the MSD is of a string type.

15. The at least one machine readable storage medium of claim 9, wherein the command is a +CECALL command, wherein a syntax of the +CECALL command is represented as +CECALL=<type_of_eCall>[,<format>,<msd_data_length>,<msd_data>], wherein <type_of_eCall> indicate a type of eCall, <format> indicates a format associated with the MSD, <msd_data_length> is a size of the MSD, and <msd_data> is the MSD.

16. An apparatus of a user equipment (UE) operable to initiate an emergency call (eCall) to a network, the apparatus comprising:
a terminal adaptor (TA);
a terminal equipment (TE) operable to generate an attention (AT) command to trigger an eCall from the UE to the network, wherein the AT command includes a minimum set of emergency related data (MSD) associated with the eCall and selected configuration information associated with the eCall; and a mobile termination (MT) operable to:
  receive the AT command that includes the MSD and the selected configuration information from the TE via the TA; and
  initiate the eCall to the network in response to receiving the AT command from the TE, wherein the MSD is provided to the network during initiation of the eCall to the network.

17. The apparatus of claim 16, wherein the TE is further operable to generate an AT command to include additional data in an updated MSD to be provided to the network during an ongoing eCall at the UE.

18. The apparatus of claim 16, wherein the selected configuration information includes:
  a type of eCall parameter of an integer type, wherein the type of eCall parameter indicates a type of eCall;
  a format parameter of an integer type, wherein the format parameter indicates a format of the MSD; and
  an MSD data length parameter of an integer type, wherein the MSD data length parameter indicates a size of the MSD.

19. The apparatus of claim 18, wherein the type of eCall is one of: a test call represented by an integer value of "0", a reconfiguration call eCall represented by an integer value of "1", a manually initiated eCall represented by an integer value of "2" or an automatically initiated eCall represented by an integer value of "3".

20. The apparatus of claim 18, wherein the format of the MSD includes a binary format represented by an integer value of "1".

21. The apparatus of claim 16, wherein the MSD is of a string type.

22. The apparatus of claim 16, wherein the AT command is a +CECALL command, wherein a syntax of the +CECALL command is represented as +CECALL=<type_of_eCall>[,<format>,<msd_data_length>,<msd_data>], wherein <type_of_eCall> indicate a type of eCall, <format> indicates a format associated with the MSD, <msd_data_length> is a size of the MSD, and <msd_data> is the MSD.

* * * * *